A. R. WEAVER.
VEHICLE WHEEL.
APPLICATION FILED OCT. 11, 1911.
1,081,416.
Patented Dec. 16, 1913.
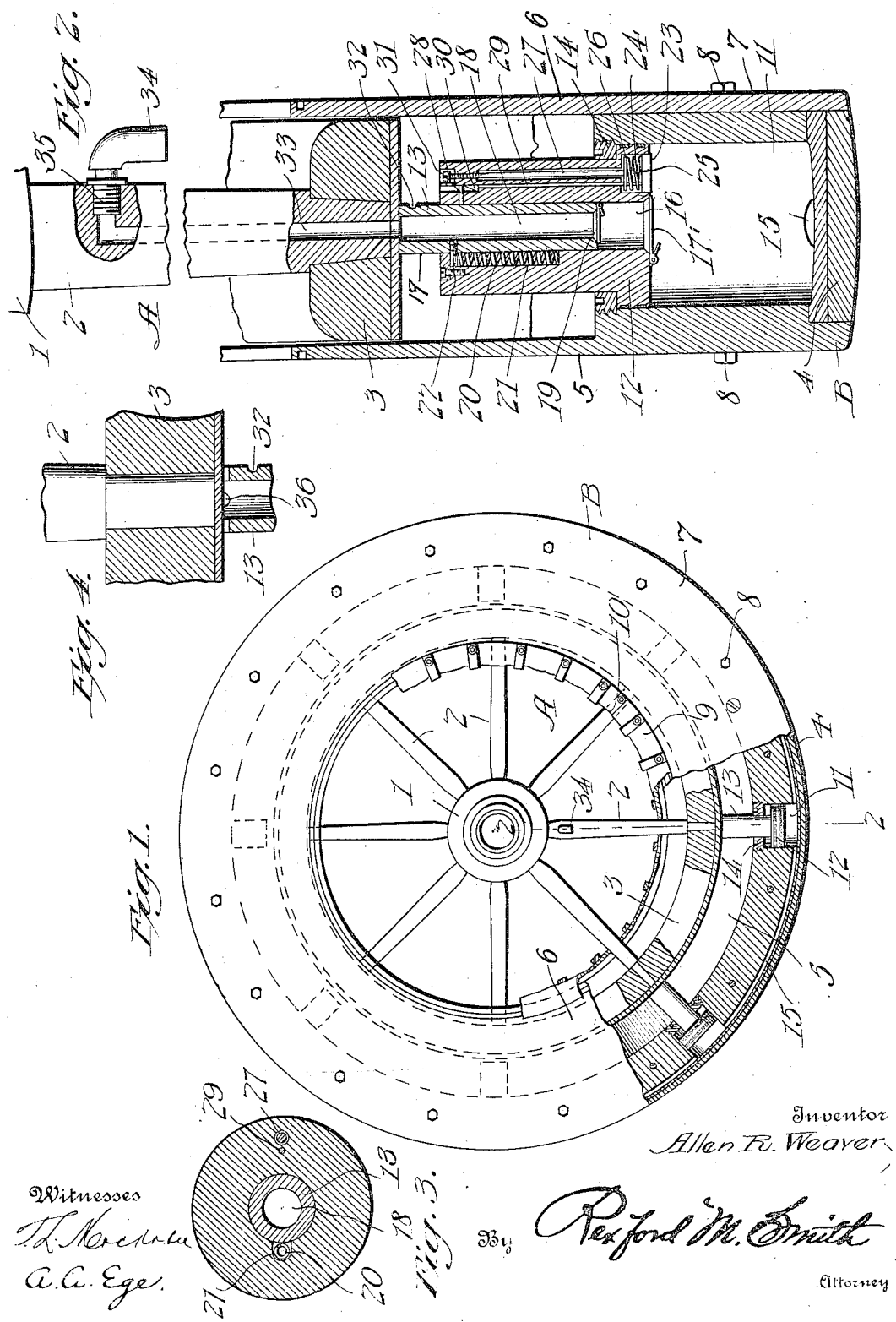
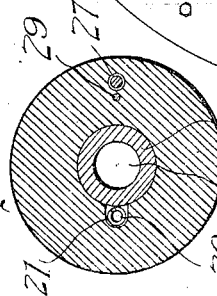

UNITED STATES PATENT OFFICE.

ALLEN R. WEAVER, OF BATESVILLE, ARKANSAS.

VEHICLE-WHEEL.

1,081,416.

Specification of Letters Patent.   Patented Dec. 16, 1913.

Original application filed February 17, 1910, Serial No. 544,386. Divided and this application filed October 11, 1911. Serial No. 654,071.

*To all whom it may concern:*

Be it known that I, ALLEN R. WEAVER, a citizen of the United States, residing at Batesville, in the county of Independence and State of Arkansas, have invented certain new and useful Improvements in Vehicle-Wheels, of which the following is a specification, reference being had therein to the accompanying drawing.
This invention relates to an inflating or pumping mechanism for resilient or pneumatic wheels of that type embodying a plurality of interconnected cylinder and piston cushioning means spaced around and disposed between the inner and outer relatively movable sections of the wheel, a wheel of this type being disclosed in my pending application for Letters Patent of the United States, Serial No. 544,386, of which this application is a division.

The invention has for its primary object to provide a simple, effective and novel pumping or inflating mechanism which is designed for use in connection with a wheel of the type referred to, although it may be used for other pneumatic wheels or devices where fluid under pressure is to be maintained at a predetermined pressure.

Another object is the employment of a reliable regulating device whereby the operation of the pumping means is automatically interrupted when the pressure of the fluid delivered by the pumping means attains a predetermined point, and also whereby the operation of the pumping means will be automatically resumed when the pressure in the wheel falls below the desired point, with the result that the wheel will always possess practically the same resiliency.
With such and other objects in view, as will appear as the description proceeds, the invention comprises the various novel features of construction and arrangement of parts which will be more fully described hereinafter and set forth with particularity in the claims appended hereto.

In the accompanying drawings, which illustrate one embodiment of the invention, Figure 1 is a side elevation of the wheel with portions broken away to illustrate the details of construction. Fig. 2 is an enlarged detail sectional view on line 2—2, Fig. 1. Fig. 3 is a transverse section on line 3—3, Fig. 2. Fig. 4 is a detail view of a modification of the air inlet ports of the inflating means.

Similar reference characters are employed to designate corresponding parts throughout the views.

Referring to the drawing, A designates the inner section or body of the wheel, and B, the outer section thereof, the inner section consisting preferably, although not necessarily, of a hub 1, spokes 2, and a circumferential ring or rim 3 fastened to the spokes. The outer section B is in the form of an annular body consisting of a tire or ring 4 which has an internal diameter somewhat larger than the diameter of the inner section so that the two sections can assume an eccentric relation. The section 4 has inwardly-extending annular flanges 5 and 6 which are of such radial dimensions as to overlie the opposite sides of the ring 3 of the inner section of the wheel so that the two sections are maintained in a common plane and prevented from axial displacement, and it will be understood that the circumferential portion of the inner section slides freely between the flanges 5 and 6. The flange 6 is a portion of a flat ring 7 removably secured to the annulus or body 4 of the tire section B by bolts 8 so as to enable the sections of the wheel to be assembled or disassembled. Covering the gap between the two flanges is a flexible guard or apron 9 that extends across the inner surface of the ring 3 of the inner section, said apron having openings 10 to receive the spokes 2. In this manner, the apron effectively excludes dust or dirt from entering between the sections of the wheel and causing excessive wear of the movable parts.

The pneumatic cushioning means between the two sections of the wheels comprises a plurality of piston and cylinder pneumatic devices spaced around the wheel. These devices comprise cylinders 11 formed radially in the ring 4 of the tire section of the wheel, which ring is preferably of metal and in these cylinders are pistons 12 that have stems 13 that extend inwardly to bear against the periphery of the inner section of the wheel. The inner ends of the cylinders are tapped to receive bushing rings 14 through which the piston stems slide, the said rings forming stops for limiting the inward movement of the pistons and these bushing rings are so adjusted and the stems of the pistons are of such length that when the two sections of the wheel are in concentric relation, the pistons 12 will bear against their respective bushing rings 14 and the inner ends of the piston stems 13 will just bear against the periphery of the inner section A of the wheel. Thus, when a load is placed on the inner section A, the latter will move to a position eccentric with respect to the outer section and the pistons at the bottom of the wheel will be pressed downwardly or outwardly while the upper portion of the inner section A of the wheel will be out of contact with the stems of the pistons at the top of the wheel. The cylinders 11 are preferably interconnected by passages 15 in the outer section B so that in all the cylinders there will be substantially the same air pressure and it is the air acting under the pistons at the bottom of the wheel that sustains the load and insures the required resiliency.

One or more of the pistons 13 may be provided with a pump or inflating mechanism whereby the required pressure may be maintained in the air chamber of the wheel. This pumping or inflating mechanism is clearly shown in Fig. 2, wherein the piston 12 has a bore 16 passing through it and through its stem to form a cylinder for the pump plunger 17. Between the air space 11 of the wheel and the bore 16 is a check valve 17' which opens and closes during the reciprocation of the plunger 17, so that air can pass into the air space 11 from the pump cylinder 16. The plunger 17 may be made with a bore or passage 18 for permitting the incoming air to enter the cylinder 16, there being a check valve 19 which opens during the suction stroke and closes during the discharge stroke. The plunger 17 is moved on its suction stroke or inward stroke with respect to the center of the wheel by means of a spring 20 seated in a recess 21 in the bore 16 of the piston 12, one end of the spring bearing against a pin or other abutment 22 fastened to the plunger 17, said spring being compressed during the discharge stroke of the plunger 17 so as to be placed under tension for returning the plunger during the suction stroke. The suction stroke of the plunger takes place during the time the inflating means is revolving through the first upper quarter of the revolution of the wheel and the discharge stroke takes place as the inflating means revolves through the second upper quarter of the revolution. During the revolution of the inflating means, the piston stem 13 is out of contact with the circumference of the inner section of the wheel but the plunger 17 remains in contact with the said circumference because of the tension of the spring 20 acting on the plunger. It will thus be seen that the pump plunger 17 moves back and forth with respect to the piston stem 13 once in each revolution of the wheel and that it is idle during one half of each revolution and active during the other half when it is necessary to supply air to the air space of the wheel to maintain the desired pressure. The inflating means need not be operative at all times but only when the pressure in the air chamber of the wheel falls below a predetermined point. An automatic regulating means is provided for controlling the operation of the plunger 17. This regulating means comprises a pressure-responsive device in the form of a piston, diaphragm or the like 23, set in a chamber or cylinder 24 in the piston 12 and seated on a compression spring 25. The spring in turn is seated on a plate or disk 26 which bears against an adjusting rod or screw 27 that extends longitudinally through the stem 13 of the piston and terminates in a head 28, which can be engaged by a screw driver or other implement for adjusting the rod so as to vary the tension of the spring 25. Also extending through the stem 13 is a rod 29 which bears at one end on the disk 26 and which is provided at the other end with a cam 30 that operates on a locking bolt or pin 31 that is slidably mounted in the stem 13 so as to engage in a recess 32 in the plunger 17, the said recess being so located that when the plunger is moved into the piston stem 13 as far as it will go, the pin or locking bolt 31 can be shoved into the recess by the cam 30 when the cam is shifted by the action of the pressure-responsive device at the time the air pressure in the wheel has attained a point for which the spring 25 is set. The recess 32 is so shaped that the bolt or pin 31 cannot positively lock the piston after the cam 30 moves out of engagement with the locking pin, as when the pressure in the air space of the wheel falls to such a point that air must be again supplied by the inflating or pumping means. The air may be supplied to the bore 18 of the plunger 17 in any suitable manner, as for instance, through a passage 33 formed in one of the spokes of the inner section of the wheel and the inlet end of this passage is preferably provided with means for preventing the entrance of dust or dirt, such means consisting of an elbow-shaped inlet nozzle 34 swiveled or loosely hung in a nipple 35 fastened to the spoke. In the modification shown in Fig. 4, the passage 33 is dispensed with and the end of the plunger that contacts with the inner section of the wheel has one or more notches 36, as shown in Fig. 4, so as to form air inlet ports.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claims appended hereto.

Having thus described the invention, what I claim as new, is:—

1. A wheel comprising relatively movable parts, one part having a chamber for containing air under pressure, a piston therein having a bore leading into the chamber, a check valve between the piston and chamber for admitting air from the former to the latter, a plunger adapted to reciprocate in the piston by the relative movement of the said parts of the wheel and having a bore through which air is admitted to the latter, and a check valve carried by the plunger to admit air thereto.

2. A wheel comprising relatively movable parts, one part having a chamber for containing air under pressure, a piston therein having a bore leading into the chamber, a valve between the piston and chamber for admitting air from the former to the latter, a plunger adapted to reciprocate in the piston by the relative movement of the said parts of the wheel and having a bore through which air is admitted to the latter, a check valve carried by the plunger to admit air thereto, and pressure-responsive means for interrupting movement of the plunger when the pressure in the chamber reaches a predetermined point.

3. A wheel comprising an outer non-deformable tread section, an inner section of smaller diameter to permit the sections to assume an eccentric relation to each other, pneumatic cushioning means between the sections, an air pump cylinder carried by one of the sections, a piston in the cylinder bearing constantly against the other section for reciprocation by the relative changing eccentricity of the sections as the wheel rotates.

4. The combination of a pneumatic resilient wheel, with a combined cushioning and air replenishing device comprising a cylinder, a piston movable therein and provided with a bore, a check valve for said bore, a hollow plunger working in said bore, a plunger valve, and a plunger retracting spring.

5. The combination of a pneumatic resilient wheel, with a combined cushioning and air replenishing device comprising a cylinder, a piston movable therein and provided with a bore, an air compressing plunger working in said bore, a pressure regulating piston carried by the cylinder piston, and plunger locking means controlled by the regulating piston and carried by the cylinder piston.

6. The combination of a pneumatic resilient wheel embodying a cylinder, a piston movable therein and provided with a bore, an air compressing plunger working in said bore and having a bore for admitting air to the cylinder, and a governing means for the plunger, said means being carried wholly by the piston and consisting of a pressure responsive piston, a back spring for said piston, plunger locking means controlled by the pressure responsive piston, and a screw for regulating the pressure of said spring.

7. The combination of a pneumatic resilient wheel, with a piston provided with a bore, an air compressing plunger working in said bore, a pressure responsive piston, and plunger locking means controlled thereby, said means comprising a pin adapted to move transversely to the plunger to engage and lock the same, and a wedge movable parallel with the plunger for operating said pin, said wedge being moved by the pressure responsive piston.

8. In a structure of the class described, the combination of a piston having a bore, a cylinder in which the piston reciprocates, a discharge valve in the bore, a plunger mounted to reciprocate in the bore, a suction valve, a locking device for holding the plunger against movement, a wedge for operating the device, said wedge being mounted in the piston at one side of the plunger and movable parallel with the latter, and means responsive to the pressure of fluid delivered into the cylinder from the said bore for controlling the movement of the wedge.

9. In a structure of the class described, the combination of a piston and cylinder cushioning device, the piston having a bore, a plunger movable in the bore and adapted to extend from one end thereof, an element to be cushioned arranged to move into and out of engagement with the piston and to engage the plunger for reciprocating the same, an inlet valve for admitting air to the bore of the piston, a discharge valve for permitting air to pass from the bore of the piston to the cylinder, a device arranged to engage the plunger to hold the same against movement when the pressure in the cylinder reaches a predetermined point, a pressure-responsive means for controlling the said device and an adjusting device extending through the piston to engage and adjust the pressure-responsive means, the outer end of the said adjusting device being at the outer end of the piston.

10. A wheel comprising an outer and an inner section, an air cushioning means between them, a pump cylinder in one of the sections and communicating with the said means for delivering air thereto, and a piston in the cylinder with its outer end held in contact with the other section by the pressure of the air on the cylinder.

11. A wheel comprising an outer section, an inner section, a cylinder in the outer section, a piston movable in the cylinder and adapted to engage the periphery of the inner section, means for limiting the movement of the piston toward the center of the wheel whereby the piston is maintained out of contact with the inner section during a portion of a revolution of the wheel, and an air replenishing pump carried by the piston and having an element constantly bearing against the periphery of the inner section.

12. A wheel having a peripheral portion including a piston and cylinder cushion device, a pump plunger in the piston movable therewith and also independently thereof, and valves on the piston and plunger through which air is admitted to the cylinder as the plunger moves independently of the piston.

In testimony whereof I affix my signature in presence of two witnesses.

ALLEN R. WEAVER.

Witnesses:
E. H. GLENN,
H. A. STOWELL.

Copies of this patent may be obtained for five cents each, by addressing the "Commissioner of Patents, Washington, D. C."